(12) United States Patent
Abi Rafeh

(10) Patent No.: US 12,458,789 B2
(45) Date of Patent: Nov. 4, 2025

(54) COMBINED BLOOD PUMP AND OXYGENATOR SYSTEM AND RELATED METHODS

(71) Applicant: OX MED INC., Covington, LA (US)

(72) Inventor: Nidal Abi Rafeh, Covington, LA (US)

(73) Assignee: Bioxy Med L.L.C-FZ, Dubai (AE)

( * ) Notice: Subject to any disclaimer, the term of this patent is extended or adjusted under 35 U.S.C. 154(b) by 694 days.

(21) Appl. No.: 17/895,341

(22) Filed: Aug. 25, 2022

(65) Prior Publication Data
US 2023/0022901 A1    Jan. 26, 2023

Related U.S. Application Data

(63) Continuation of application No. PCT/EP2021/054671, filed on Feb. 25, 2021.
(Continued)

(51) Int. Cl.
*A61M 60/113* (2021.01)
*A61M 1/36* (2006.01)
(Continued)

(52) U.S. Cl.
CPC ........ *A61M 60/113* (2021.01); *A61M 1/3623* (2022.05); *A61M 60/232* (2021.01);
(Continued)

(58) Field of Classification Search
CPC .............. A61M 1/3601; A61M 1/1698; A61M 1/3666; A61M 60/508; A61M 60/38; A61M 60/113
See application file for complete search history.

(56) References Cited

U.S. PATENT DOCUMENTS

| | | |
|---|---|---|
| 3,505,686 A | 4/1970 | Bodell |
| 4,159,720 A | 7/1979 | Burton |
| (Continued) | | |

FOREIGN PATENT DOCUMENTS

WO    2020008488    1/2020

OTHER PUBLICATIONS

WIPO, International Search Report in corresponding PCT application PCT/EP2021/054671, Jun. 2, 2021.
(Continued)

*Primary Examiner* — Leslie R Deak
(74) *Attorney, Agent, or Firm* — Alley IP

(57) ABSTRACT

A blood pump-oxygenator system comprises at least one blood pump, an oxygenator, inflow and outflow cannulas, connected to form a closed series circuit operable as a cardiopulmonary bypass system for extracorporeal processing of the patient's blood. The blood pump conveys blood through the circuit from the patient into the inflow cannula, through the oxygenator and out of the outflow cannula back into the patient. A manifold is connected between the inflow and outflow cannulas so blood passes through the manifold, wherein the manifold accommodates the blood pump and the oxygenator to form a recirculation loop configured to recirculate at least part of the blood in the circuit so the blood passes over the oxygenator multiple times. An extra blood pump is positioned at the outflow cannula to deliver a set volume to the patient, controllable independently from the blood pump that circulates the blood in the manifold including the oxygenator.

20 Claims, 17 Drawing Sheets

Related U.S. Application Data

(60) Provisional application No. 62/981,079, filed on Feb. 25, 2020.

(51) Int. Cl.
*A61M 60/232* (2021.01)
*A61M 60/237* (2021.01)
*A61M 60/38* (2021.01)
*A61M 60/414* (2021.01)
*A61M 60/508* (2021.01)
*A61M 60/833* (2021.01)
*A61M 25/00* (2006.01)

(52) U.S. Cl.
CPC .......... *A61M 60/237* (2021.01); *A61M 60/38* (2021.01); *A61M 60/414* (2021.01); *A61M 60/508* (2021.01); *A61M 60/833* (2021.01); *A61M 2205/36* (2013.01)

(56) References Cited

U.S. PATENT DOCUMENTS

| | | | |
|---|---|---|---|
| 4,346,006 A | 8/1982 | Kopp et al. | |
| 4,583,969 A | 4/1986 | Mortensen | |
| 4,631,053 A | 12/1986 | Taheri | |
| 4,743,250 A | 5/1988 | Kitagawa et al. | |
| 5,411,706 A * | 5/1995 | Hubbard | A61M 60/113 |
| | | | 210/651 |
| 6,117,390 A | 9/2000 | Corey, Jr. | |
| 6,773,670 B2 * | 8/2004 | Stringer | A61M 1/3626 |
| | | | 96/6 |
| 2020/0038574 A1 | 2/2020 | Rampolla | |
| 2024/0033408 A1 * | 2/2024 | Linehan | A61M 1/3666 |

OTHER PUBLICATIONS

WIPO, Written Opinion in corresponding PCT application PCT/EP2021/054671, Jun. 2, 2021.

* cited by examiner

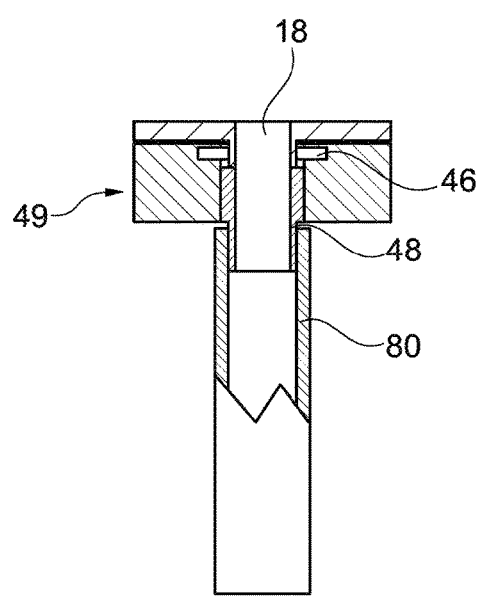
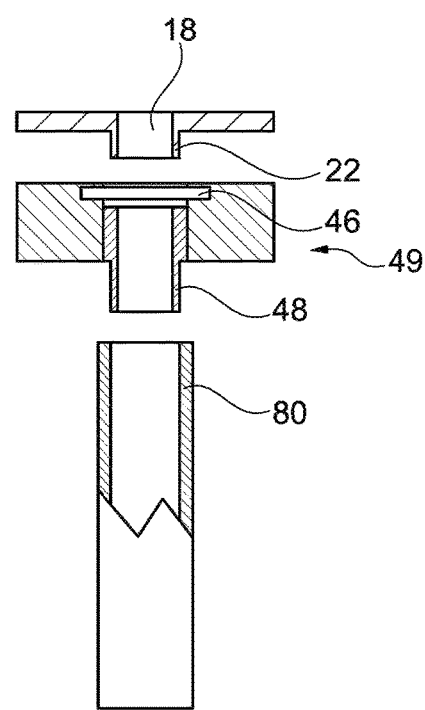
FIG. 14A
FIG. 14B

COMBINED BLOOD PUMP AND OXYGENATOR SYSTEM AND RELATED METHODS

RELATED APPLICATIONS

This application claims the benefit under 35 U.S.C. § 120, and is a continuation, of co-pending International Application PCT/EP2021/054671, filed Feb. 25, 2021 and designating the US, which claims priority to U.S. Application 62/981,079, filed Feb. 25, 2020, the benefit of such US application also being claimed under 35 U.S.C. § 119. These US and International applications are incorporated by reference herein in their entireties.

FIELD

The present invention relates generally to the field of blood pumps and oxygenators used to increase the perfusion and oxygen level in a patient. More particularly, the present invention involves a simplified pump-oxygenator system that is easy to setup and use.

BACKGROUND

Many types of blood pump-oxygenator systems are well known in the art. For example, during open-heart surgery, the patient is interconnected with an external pump-oxygenator system, commonly known as a heart-lung machine, which circulates blood and introduces oxygen into the blood system. Most types of pumps employ a roller or a centrifugal pump to flow blood in the patient's vascular system. Most types of oxygenators also use a gas-permeable membrane, wherein blood flows along one side of the membrane and oxygen is supplied to the other side of the membrane. Given a sufficient pressure gradient between the oxygen supply and the blood, the oxygen will diffuse through the membrane and into the blood. In addition, carbon dioxide will tend to diffuse from the blood into the membrane.

Typical cardiopulmonary bypass systems are rather complex, and generally are not particularly well adapted for applications longer than 6 hours. Moreover, most standard systems exhibit poor hemodynamic characteristics. That is, such systems typically cause too much damage to the blood to be useful for extended periods.

For example, typical cardiopulmonary bypass systems are disclosed in U.S. Pat. No. 3,890,969 to Fischel, U.S. Pat. No. 4,466,804 to Hino, and U.S. Pat. No. 4,610,656 to Mortensen. Such conventional systems commonly utilize several pumps, a venous reservoir, an arterial reservoir, and a separate bubble-trapping device. These conventional systems exhibit several disadvantages. The most apparent disadvantage is the overall complexity of such systems. For example, the pumps may need to be synchronized with each other, or each of the reservoirs or bubble traps may need a special support frame. Also, the numerous components require extensive tubing and interconnections.

The complexity of the conventional systems leads to higher costs of manufacture and operation. Also, the more complex systems may take longer to set up, and system setup may require expert personnel and supervision. Even with such expert personnel present, the system's complexity increases the risk of error in setting up the system. Likewise, once in operation, a conventional system requires continuous monitoring and adjustment by expert personnel.

Conventional cardiopulmonary bypass systems are also not usable for long-term application because they significantly damage the blood after a fairly short use (e.g., 6-8 hours). For instance, conventional occlusive roller pumps mechanically destroy red blood cells. This "blood trauma" can occur in any cardiopulmonary bypass system. It is caused and/or aggravated by occlusive pumps, interconnections and other system components likely to increase system pressure or turbulence. Similarly, conventional oxygenators beyond few hours to a day result in diminished performance due to plasma leakage into the hollow fibers.

The above factors illustrate the need for and desirability of a simple cardiopulmonary bypass system with relatively few components. Devices similar to that disclosed in U.S. Pat. No. 4,540,399 to Litzie et al. represent attempts to achieve such simplicity. Litzie et al. disclose an emergency bypass system with one non-occlusive pump, an oxygenator, and a separate bubble trap. Litzie et al. describes a centrifugal rotor-type pump connected proximal to (i.e., on the venous side of) the oxygenator. While Litzie et al. represents a simplified cardiopulmonary bypass system compared to other known systems, it still requires the bubble-trapping device in addition to the pump and oxygenator.

In other situations, a smaller, implantable oxygenator may be sufficient to adequately supplement the patient's cardiopulmonary function by marginally increasing the oxygen content of the patient's blood. For example, patients suffering from emphysema, pneumonia, congestive heart failure, or other chronic lung disease often have blood oxygen partial pressures of approximately 40 torr. A relatively small increase of 10% to 20% is generally sufficient to adequately maintain the patient. This is a particularly desirable alternative in that it avoids the need to intubate the patient in such cases. In addition, temporary use of this type of oxygenator is sufficient in many cases to tide the patient over an acute respiratory insult. Placing such patients on a conventional respirator is often the beginning of a progressive downhill spiral by damaging the patient's pulmonary tree and thereby causing greater dependence on the respirator.

A number of devices and processes have been invented in the past incorporating this basic technology, including the following:

| Inventor | U.S. Pat. No. | Issue Date |
| --- | --- | --- |
| Bodell | 3,505,686 | Apr. 14, 1970 |
| Burton | 4,159,720 | Jul. 3, 1979 |
| Kopp, et al. | 4,346,006 | Aug. 24, 1982 |
| Mortensen | 4,583,969 | Apr. 22, 1986 |
| Taheri | 4,631,053 | Dec. 23, 1986 |
| Kitagawa, et al. | 4,743,250 | May 10, 1988 |

The Bodell patent demonstrates the general concept of using gas permeable fibers to boost the oxygen level of blood. In the implantable embodiment of the Bodell device, a tubular casing serves as a shunt either from the pulmonary artery to the left atrium of the heart, or more generally between an artery and a vein. A multitude of parallel-connected capillary tubes are used to oxygenate and/or purify the blood circulating through the casing.

The Mortensen patent shows a transvenous oxygenator made of a plurality of small diameter gas permeable tubes. However, the specific device disclosed by Mortensen has a significant disadvantage in that two incisions are required. The insertion process is also rather complex.

The Taheri patent discloses a transvenous oxygenator having a single membrane through which oxygen diffuses. The membrane is disposed within a sheath and a flexible wire supports both.

A need exists for a circulatory support system capable of supporting a patient in circulatory dysfunction for some length of time. Such a circulatory support system would be quite useful in numerous situations, such as (1) where the patient is in a state of cardiogenic shock; (2) where the patient is in a state of septic shock, (3) for post cardiotomy weaning from the bypass, (4) for assisting the circulatory system to avoid an impending myocardial infarction; and (5) bridge-to-transplant patients. It is highly desirable to simplify the system as much as possible.

The present invention is directed at addressing this need and eliminating, or at least reducing the effects of, the shortcomings of the prior art systems as described above.

SUMMARY

The present invention provides a greatly simplified cardiopulmonary bypass system. The system of the present invention can be implemented using only two basic components (a pump and an oxygenator), without the need for a specialist to setup and maintain the system, the requisite tubes, connectors, and cannulations. The components are connected as a closed series circuit adapted for extracorporeal processing of the patient's blood.

According to one aspect, a blood pump-oxygenator system comprises at least one blood pump, an oxygenator, an inflow cannula, and an outflow cannula, which are connected so as to form a closed series circuit to be operable as a cardiopulmonary bypass system adapted for extracorporeal processing of the patient's blood. The blood pump is configured to convey blood through the circuit from the patient into the inflow cannula, through the oxygenator and out of the outflow cannula back into the patient. A manifold is connected between the inflow cannula and the outflow cannula so that the blood passes through the manifold, wherein the manifold accommodates the blood pump and the oxygenator and is designed so as to form a recirculation loop configured to recirculate at least part of the blood in the circuit such that the blood passes over the oxygenator multiple times. The system further comprises an extra blood pump positioned at the outflow cannula and configured to deliver a set volume to the patient, wherein the extra pump is configured to be controlled independently from the blood pump that circulates the blood in the manifold including the oxygenator.

To eliminate the need for separate reservoirs, the pump-oxygenator system of the present invention may be provided with pressure feedback system to control the pump suction force. In this regard, the system of the present invention is a relatively static-volume system as compared to conventional systems, which normally include one or more separate reservoirs or the like. The pump-oxygenator system may be equipped with a gas heater and thermal insulation so as to eliminate the need for a heat exchanger to maintain fluid temperature. The reduced size of the system and the reduced dwell time of the blood outside the patient's body also eliminate the need for a heat exchange system.

To eliminate the need for a separate bubble trap, negative pressure is used to circulate gas in the oxygenator. The pump-oxygenator may be positioned such that the fluid may flow through the oxygenator to the inlet of the pump by gravity, or by gravity in combination with the patient's venous pressure. This orientation further enables a smooth and low-pressure fluid flow through the system, further reducing blood trauma.

The pump/oxygenator of the present invention allows for the replacement of the pump and oxygenator without the need to replace the entire system. In other words, the pump and oxygenator are modular components that may be replaced without the need to interrupt the system operation or the need to re-prime the circuit. The pump and/or oxygenator may be mounted on a catheter, with one catheter used to remove the pump and/or oxygenator and the another inserted in its place so as to replace the pump and/or oxygenator without the need to interrupt the system operation. This feature allows the replacement of components that are not intended for long-term operation to render the system applicable for long-term use even though its components may only be adequate for short-term use only.

The system of the present invention can provide partial veno-arterial cardiopulmonary support over a relatively long period (i.e., one to ten days) because of its very low overall blood trauma and improved ease of use characteristics. The system is capable not only of providing cardiopulmonary support but also of providing hemodynamic support over a potentially long period. The system of the present invention is particularly adapted for partial hemodynamic support. Notwithstanding this, it is to be readily appreciated that the system is also suitable for achieving a number of additional objectives in a variety of situations involving circulatory dysfunction. The system of the present invention can assist circulation during relatively mild circulatory dysfunction, and also can provide acute assistance during severe refractory cardiac failure caused by myocardial infarction, cardiomyopathy, or post-cardiac surgery. The system of the present invention may also be useful in providing perioperative support and stabilization of high-risk patients, such as coronary bypass surgery patients.

The low-trauma of the present invention contributes desirable overall hemodynamic characteristics. Many of the features of the present invention that improve the overall hemodynamics of the system also help to simplify the system, and to make it more reliable and compact. The small number of system components also enables easier setup and operation, and reduces the risk of system malfunction. To further reduce the risk of system malfunction, the system may be equipped with various fail-safe features. Such equipment may be used to monitor and control various pressures and flow rates to ensure proper operation. Although the system of the present invention may require periodic monitoring and adjustment by expert personnel during operation, it is relatively automatic. That is, compared to conventional systems, which tend to be more complex, the system of the present invention requires much less monitoring and adjustment during operation.

The system of the present invention also causes less damage to the blood than conventional systems by reducing the surface area the blood interacts with, making the system of the present invention more suitable for long-term applications. Trauma to the patient's blood is reduced principally by the simplicity of the blood circuit, especially the low number of circuit elements, the non-occlusive pump and the design of the oxygenator. In addition, overall trauma to the patient is reduced. This is accomplished by reducing the extracorporeal processing of the blood as compared to conventional bypass systems and procedures. The absence of separate fluid reservoirs reduces the fluid volume of the system of the present invention. Because less of the patient's blood is withdrawn from the body at one time, the overall trauma to the patient is reduced.

The possibility of swapping oxygenators without the need to stop the system increases the usefulness of the system for long-term applications. Oxygenators in general degrade in function very rapidly over time, therefore, the possibility to change oxygenators without interrupting patient support increase the overall lifetime of the system.

The other main difference between the present invention and the prior art is that the present invention passes the blood over the oxygenator multiple times, thereby providing the same level of oxygenation and allowing the size of the oxygenator to be greatly reduced in size relative to the "single pass" prior art oxygenators. The "multiple pass" feature of the present invention is also advantageous in that it serves to provide a heat exchanger functionality as well as air entrapment.

BRIEF DESCRIPTION OF THE DRAWINGS

FIG. 14A is a cross section view of the cannula connection to the pump-oxygenator system of the present invention;

FIG. 14B is an exploded cross section view of the cannula connection to the pump-oxygenator system of the present invention;

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The systems disclosed herein boast a variety of inventive features and components that warrant patent protection, both individually and in combination.

Figure 1:
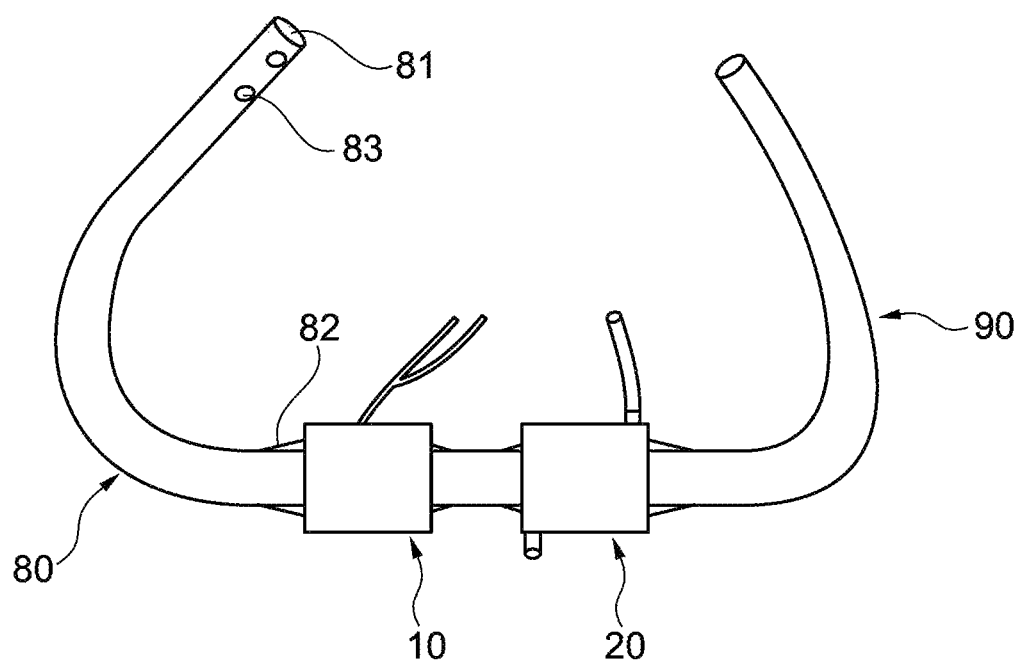
FIG. 1 is a perspective view of a pump-oxygenator system of the present invention intended for cardiopulmonary support.
Figure 2:
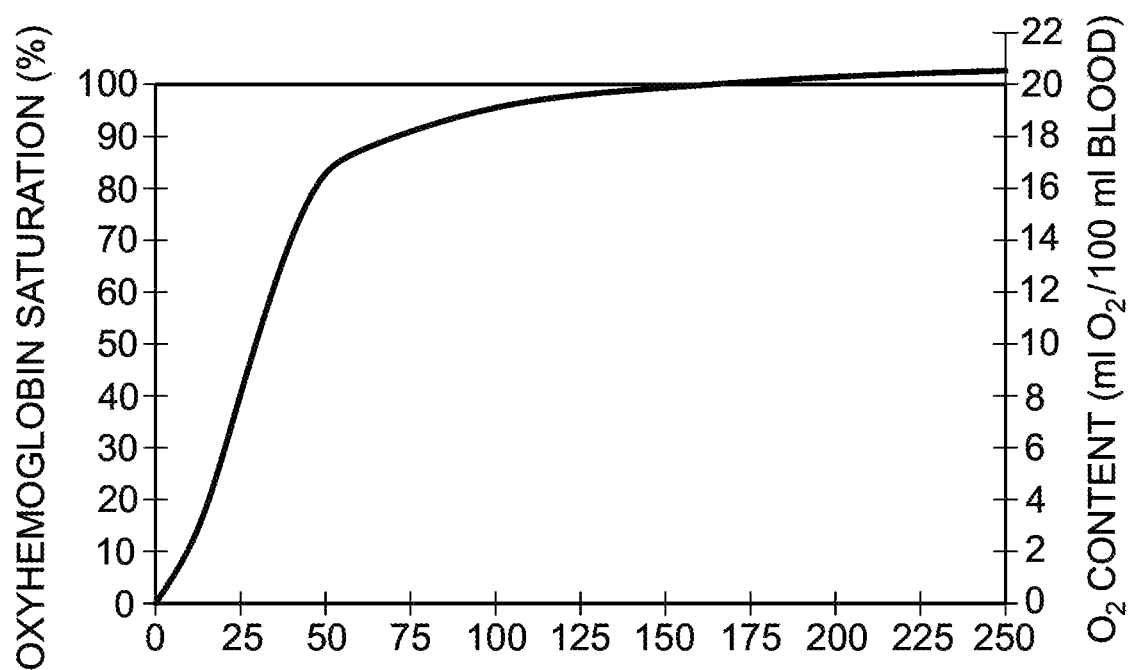
FIG. 2 is an oxygen dissociation curve indicating the limit of the amount of oxygen which can be transferred into a given blood flow stream by an oxygenator.

In accordance with the preferred embodiment of the present invention (with particular attention to FIG. 1), an extracorporeal system is provided comprising a pump 10, an oxygenator 20, an inflow cannula 80, and an outflow cannula 90. Among the inventive aspects to be described in detail herein, the extracorporeal system of the present invention boasts a miniaturized pump 10 and oxygenator 20 and a simplified circuit to allow ease of use and reduce trauma to patients by reducing the extent to which blood interacts with foreign surfaces. Cannulas 80, 90 may be any suitable cannula of known construction for use in transporting blood. Cannulas 80, 90 may be made from any suitable biocompatible material, including but not limited to urethane or silicone or similar biocompatible material. Cannulas 80, 90 may be reinforced with metallic wire or similar material to help the cannula resist kinking when bent in a sharp radius. All these details are well known in the cannula manufacturing industry and are included here for clarity.

Figure 3:
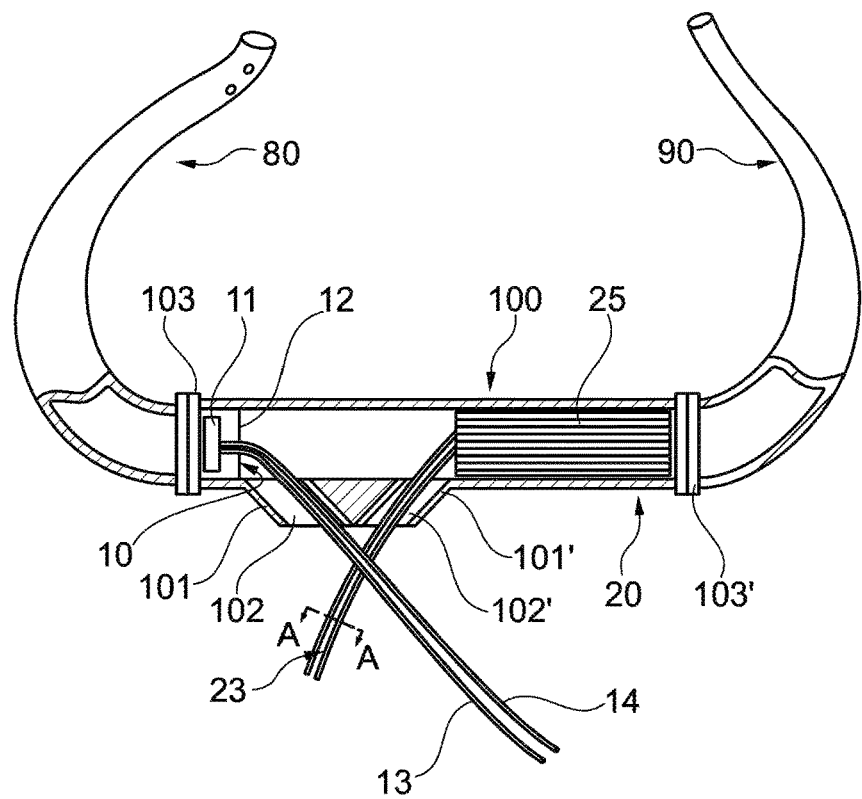
FIG. 3 is a perspective view, cut away and in section, of a pump-oxygenator system of the present invention.

Referring to FIG. 3, the pump 10 may be provided (by way of example only) as a rotary or a displacement pump and, more specifically, a rotary pump of the centrifugal type. Centrifugal pumps are a known art in the blood pumping area and are preferred due to the low cost of manufacturing and the low trauma to the blood. Blood pump 10 may be directly driven by an electric motor or driven by a flexible cable that links the pump to the electric motor (as described, for example, in U.S. Pat. No. 4,944,722). The coupling between the pump and the driving mechanics may be magnetically or directly coupled. Pump 10 is shown of the axial flow type with rotor 11 situated inside pump housing 12, with drive cable 14 inside sheath 13 coupled to rotor 11. The rotation of cable 14, by an electric motor (not shown), causes the rotation of rotor 11 and the pumping of fluid from the distal end to the proximal end of housing 12. In this fashion, fluid is transported from inflow cannula 80 toward outflow cannula 90.

According to one aspect of the present invention, manifold 100 may be provided with at least one manifold port 101 capable of passing devices or instruments therethrough for placement inside manifold 100. Suitable hemostasis valves 102 may be required to ensure hemostasis during and after such placement. Manifold 100 may be also be equipped with a quick-connect coupling 103 to facilitate the connection and disconnection of inflow cannula 80 or outflow cannula 90, as well as other components, in their perspective location in the circuit. Quick-connect coupling 103 may be provided, by way of example only, as a two-component system intended to quickly join or release two tubes, or modules, quickly and insure a fluid tight connection.

Figure 3A:
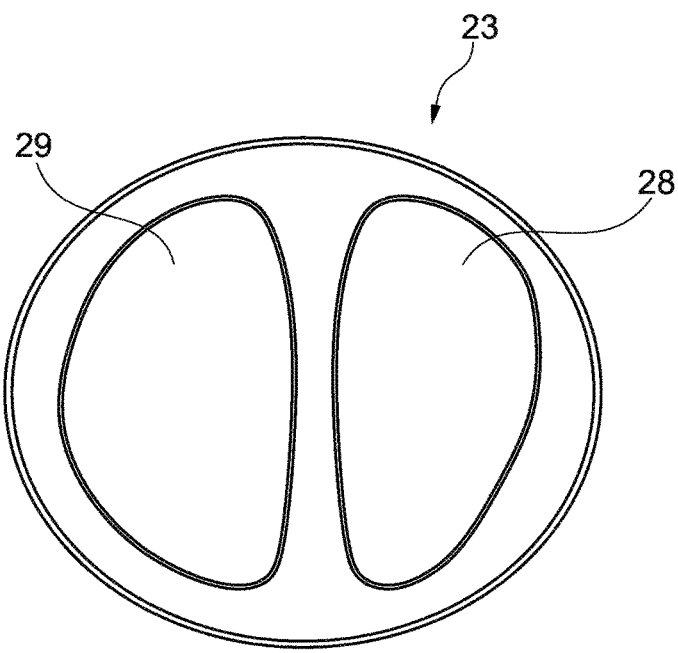
FIG. 3A is a cross section along lines A-A in FIG. 3.

As shown in FIG. 3, the pump 10 may be placed inside manifold 100 by passing it through one manifold side port 101. In this instance, hemostasis valve 102 will close around sheath 13, providing hemostasis after pump 10 is placed therethrough. In similar fashion, oxygenator 20 may be placed inside manifold 100 through manifold port 101' with hemostasis valve 102' forming a seal around oxygenator sheath 23. Sheath 23 preferably consists of at least two lumens (shown in FIG. 3A), inflow lumen 28 for oxygen delivery to oxygenator fiber 25 and outflow lumen 29 for the removal of oxygen (O2 gas) and carbon dioxide (CO2 gas) from oxygenator fiber 25. Oxygenator 20 consists of oxygenation fibers 25 that allow for blood to pass between oxygenator fibers 25 to intake oxygen and release CO2 gas. In return, oxygen is passed through the inside lumen of oxygenator fibers 25 from inflow lumen 28 at one end of oxygenator fibers 25 and returned from the other end of oxygenator fibers 25 to lumen 29 of sheath 23 for release into the atmosphere. Oxygenator 20 is matched in size to the inside diameter of manifold 100 to allow a close fit in order to limit blood flow around oxygenator 20 and force the blood to flow through oxygenator fibers 25 and maximize blood oxygen and CO2 exchange.

One main advantage of this invention is the capability to replace pump 10 or oxygenator 20 with another pump or oxygenator in case pump 10 or oxygenator 20 became defective or less efficient over time. A main draw back of most oxygenators is the continuous reduction in gas exchange capability the longer it is used due to fiber deterioration. This invention would allow the replacement of oxygenator 20 when its performance deteriorates and, importantly, will allow such replacement without the need to stop the pump or the need to prime the circuit again.

Figure 4:
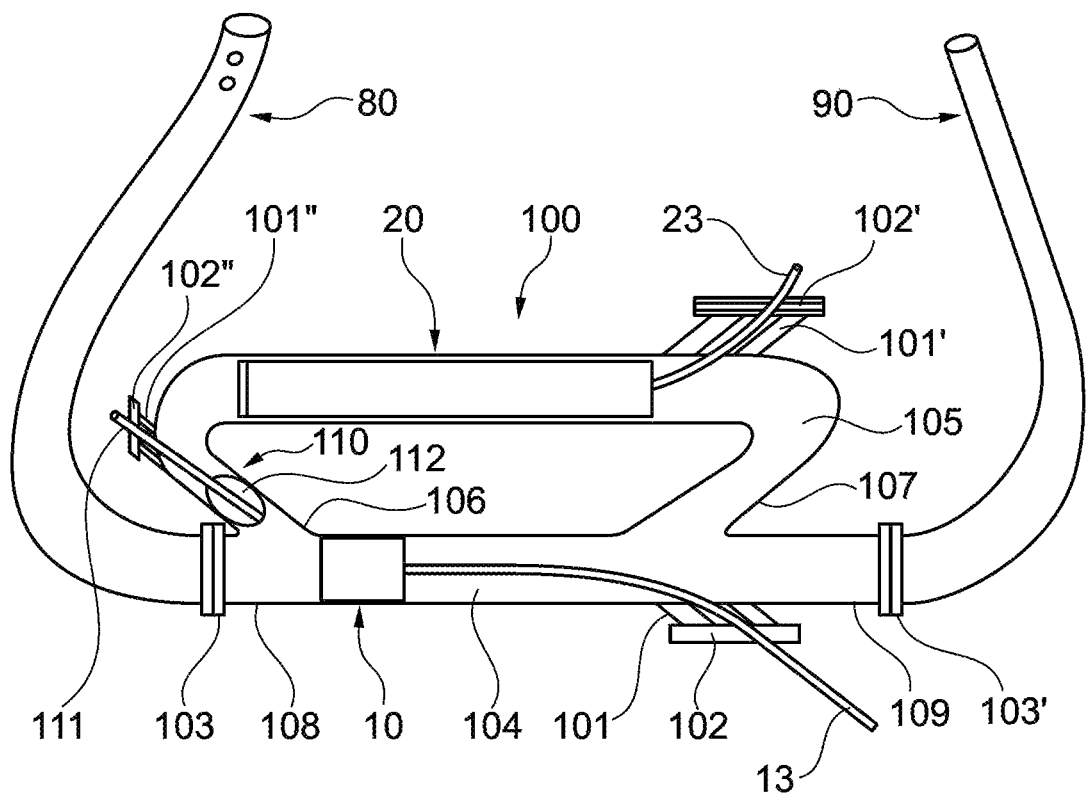
FIG. 4 is a perspective view, cut away and in section, of a pump-oxygenator system according to another embodiment of the present invention.

With reference to FIG. 4, shown is a pump-oxygenator system according to a further embodiment of the present invention. Manifold 100 consists of main trunk 104 and side trunk 105 that connects the distal end of main trunk 104 with the proximal end of main trunk 104. Pump 10 is placed through manifold side port 101 and advanced into main trunk 104 downstream from side trunk 105 junction with main trunk 104. Oxygenator 20 is placed through manifold side port 101' and advanced through portion of manifold side trunk 105. Hemostasis valves 102 and 102' form a tight seal around sheath 13 and 23 respectively. Balloon catheter 110 is placed trough manifold side port 101", which is located at side trunk distal end 106 such that hemostasis valve 102" seals around ballooned catheter shaft 111. Occluding balloon 112 is attached to the distal end of ballooned catheter shaft 111 and placed in side trunk distal end 106 but does not reach main trunk proximal end 108. Inflating occluding balloon 112, by infusing fluid (preferably saline), will partially or fully occlude manifold side trunk 105 and will limit the amount of blood that circulates through manifold side trunk 105. In essence, occluding balloon 112 sets the portion of blood flowing through manifold side branch 105 and the portion of blood flowing through manifold main trunk distal end 109 and onward to outflow cannula 90. As such, the blood flow through oxygenator 20 or the outflow cannula 90 depends on the degree to which the occluding balloon 112 is inflated. A fully inflated occluding balloon 112 will cause the blood flow from pump 10 to go entirely through outflow cannula 90 (with none flowing through the oxygenator 20). Conversely, a fully deflated occluding balloon 112 will cause the blood flow from pump 10 to go entirely through oxygenator 20 (with none flowing through outflow cannula 90).

Pump 10 may be set to deliver a flow rate in excess of what is desired to deliver to the patient, wherein all excess flow is re-circulated through the oxygenator 20 such that the blood is repeatedly subject to the exchange of O2 and CO2 within the oxygenator 20. The oxygenator 20 may be of substantially reduced size based on this "multiple pass" feature, wherein blood is passed multiple times over the oxygenator before being circulated to the patient. This "multiple pass" aspect of this invention simplifies the system and reduce its size and the blood volume needed to prime the circuit. Another advantage of this invention is the capability to place the circuit on the patient and therefore minimize the entire circuit complexity and size.

Figure 5:
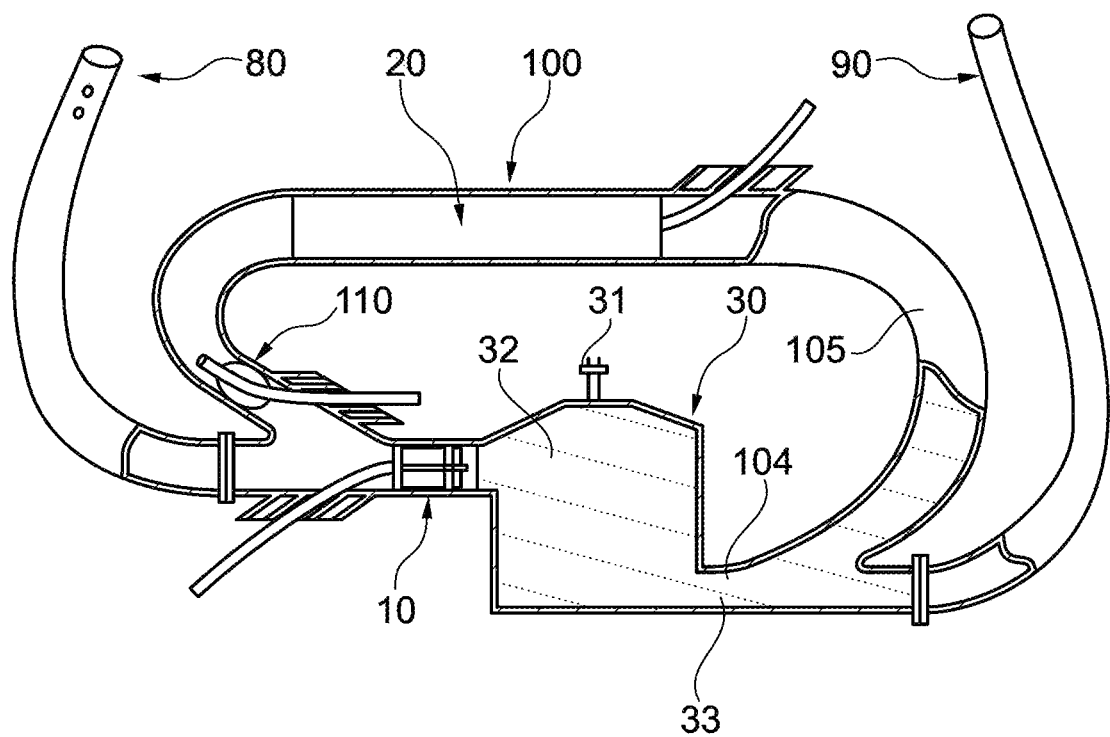
FIG. 5 is a perspective view, cut away and in section, of a pump-oxygenator system according to yet another embodiment of the present invention.

FIG. 5 illustrates yet another pump-oxygenator system according to the present invention. Manifold 100 includes a bubble trap 30 in main trunk 104 with blood pump 10 located at an inlet port 32 of bubble trap 30. Blood pump 10 empties all blood into bubble trap 30 before blood leaves to either manifold 100 side trunk 105 or to outflow cannula 90 and serves to remove any air bubbles from the pumped blood. Bubble trap 30 includes venting port 31 at the top of a conical top to vent any air entrapped in bubble trap 30. Inlet port 32 is preferably located close to the top end of bubble trap 30 while outlet port 33 is preferably located close to the bottom end. In addition, inlet port 32 of bubble trap 30 may be located to the side, rather than the center, of the main cavity 34 of the bubble trap 30 in order to enhance the formation of a vortex in the pumped blood. This will help increase the dwell time of the pumped blood in the bubble trap 30 and will capitalize on the centrifugal force to separate smaller air bubbles from the pumped blood. Bubble trap 30 may also include a screen (not shown) to trap any debris from the pumped blood. Pump 10, although shown in FIGS. 4 and 5 as being of axial design, may be centrifugal in design without affecting the function of this invention.

Figure 6:
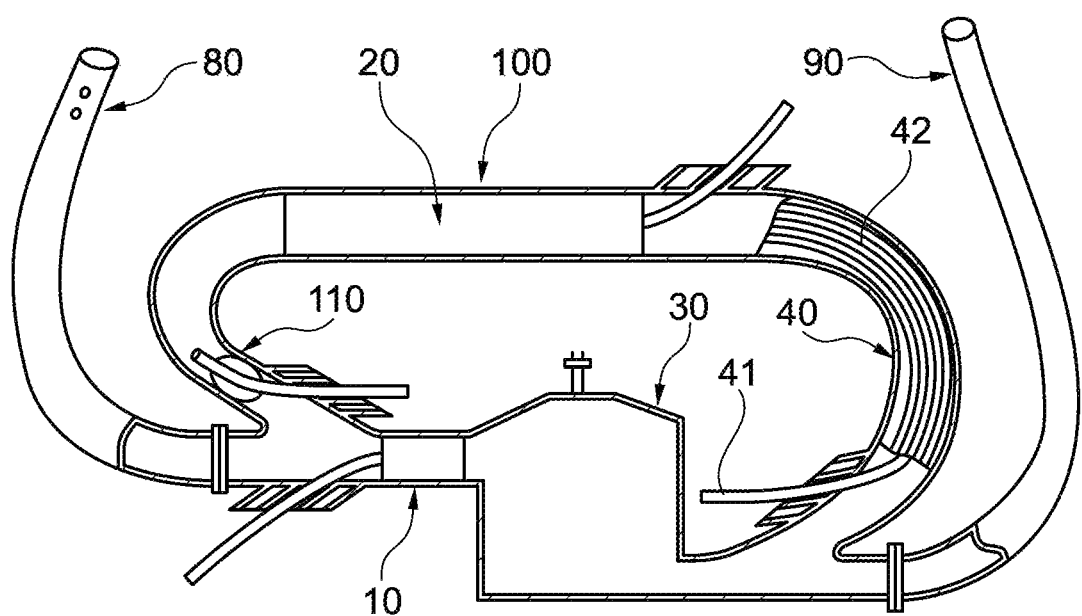
FIG. 6 is a perspective view, cut away and in section, of a pump-oxygenator system according to a still further embodiment of the present invention.

FIG. 6 illustrates a pump-oxygenator system of the present invention similar to that of FIG. 5, except for the addition of a heat exchanger 40. Heat exchanger 40 may preferably be a catheter system formed by a dual lumen catheter 41, wherein a fluid (heated or cooled) is injected through one lumen to heat or cool heating fibers 42. Heating fibers 42 are hollow fibers that are made of heat conducting material that are pliable and resist kinking to allow advancement into side trunk 105 of manifold 100 as shown in FIG. 6. Any number of suitable materials may be employed for the heat exchanger 40, including but not limited to polymeric or metallic material such as Nitinol. One end of heating fibers 42 are in communication with one lumen of dual lumen catheter 41 while the other end of heating fibers 42 is in communication with the other lumen of dual lumen catheter 41. Therefore, pumping fluid in the first lumen of dual lumen catheter 41 will direct the fluid to heating fibers 42 first such that heat will be delivered or removed from the circulating blood before the fluid exits through the second lumen.

Figure 6A:
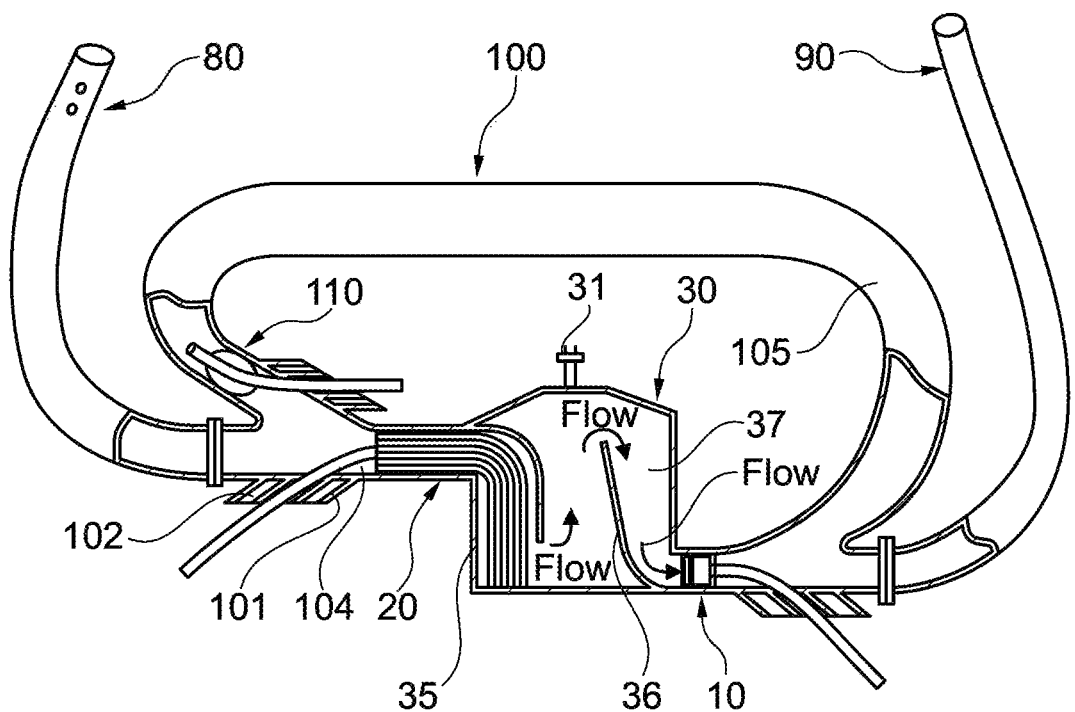
FIG. 6A is a perspective view, cut away and in section, of a pump-oxygenator system according to another embodiment of the present invention.

FIG. 6A illustrates a pump-oxygenator system of the present invention, wherein oxygenator 20 is inserted through manifold side port 101 into main trunk 104 of manifold 100 and advanced into oxygen compartment 35 of bubble trap 30. Blood flowing from inflow cannula 80 enters through oxygen compartment 35 and gets deflected upwardly by deflector 36 before it reach-es bubble trap compartment 37. Bubble trap compartment 37 allows any air bubbles to float to the top of bubble trap 30 and be removed through venting port 31. Deflector 36 and the design of bubble trap 30 in general may be fashioned to enhance the formation of a vortex flow at the top of bubble trap 30 to enhance the capability of isolating air bubbles in the top portion of bubble trap 30.

Occluding balloon 112 may be synchronized with the heart rhythm. In particular, occluding balloon 112 may be fully deflated during systole (keeping the systemic pressure to a minimum to allow the heart to eject with minimal effort) and fully inflated during diastole (causing all oxygenated blood in bubble trap 30 to empty into the patients through outflow cannula 90). In addition, bubble trap 30 may have a volume which matches the average patient's stroke volume or less, such that for each heart cycle the system empties oxygenated blood contained in bubble trap 30 before occluding balloon fully deflates and starts recirculating non-oxygenated blood drained from the venous system through inflow cannula 80. In essence, the present embodiment is designed to drain venous blood and infuse oxygenated blood during heart diastole and to recirculate blood past the oxygenator during heart systole. This will advantageously result in the heart pumping against lower systemic pressure, which translates into a lower workload on the myocardium.

Figure 6B:
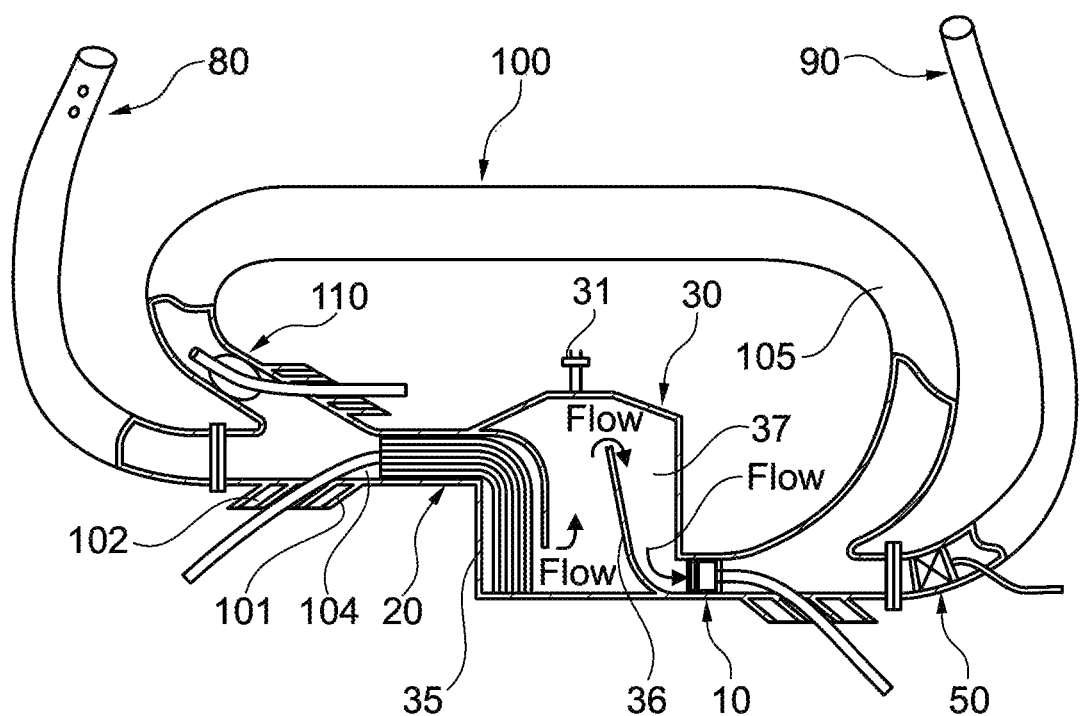
FIG. 6B is a perspective view, cut away and in section, of a pump-oxygenator system according to still another embodiment of the present invention.

FIG. 6B illustrates a pump-oxygenator system of the present invention, which is substantially identical to that illustrated in FIG. 6A. An extra pump 50 is positioned at the outflow cannula 90 to deliver a set volume to the patient. This extra pump 50 may be controlled independently from the main blood pump 10 that circulate the blood in the oxygenator portion of the device. Therefore, the blood volume delivered to the patient could be instantaneously changed according to the patient requirements.

Figure 7A:
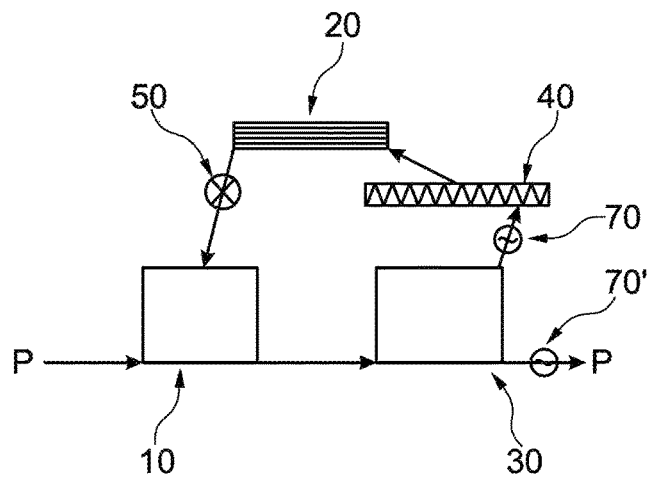
FIG. 7A, FIG. 7B, and FIG. 7C are schematics for different options for components and location in providing a pump-oxygenator system according to the present invention.
Figure 7B:
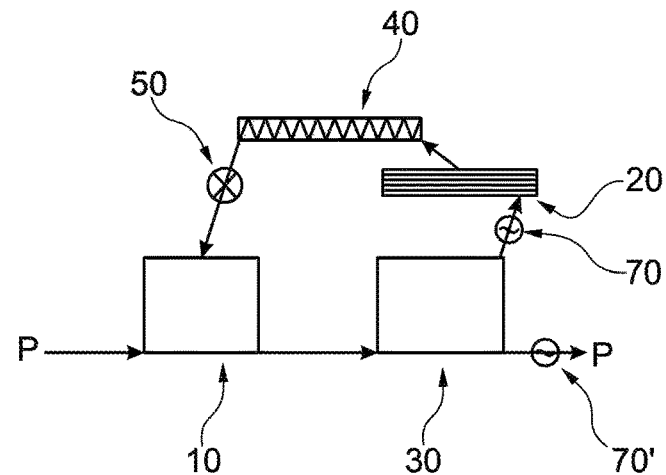
Figure 7C:
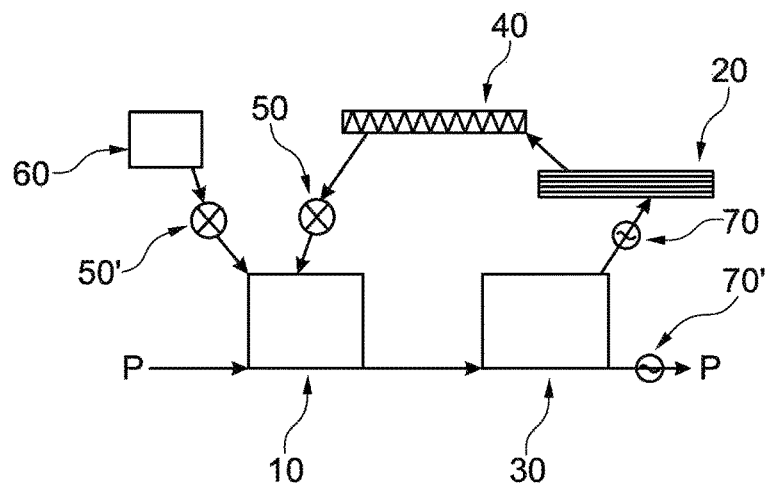
Figure 8:
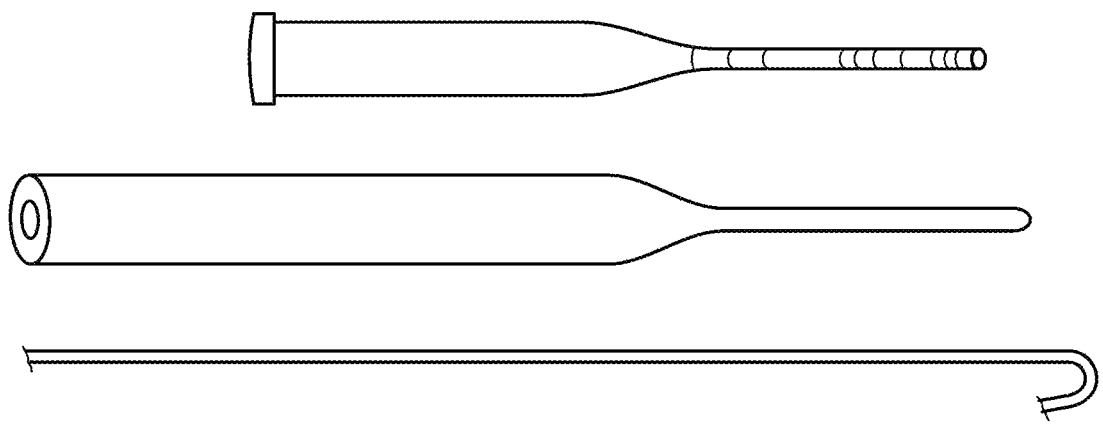
FIG. 8 is a perspective view of the components forming part of the present invention provided in a kit.

FIGS. 7A-7C represent alternative arrangements for the system components shown, by way of example only, in FIGS. 1-6. FIG. 7A is basically the same system depicted in more details in FIG. 6 with the addition of two flow meters, recirculation flow meter 70 and outflow flow meter 70' that measure flow rate in the respective part of the circuit. FIG. 7b is the same as circuit 7a with oxygenator 20 and heat exchanger 40 reversed in location in the circuit. This arrangement may beneficial in some application versus other. For example, it might be preferable to cool blood after it has passed through oxygenator 20. FIG. 7C shows the addition of reservoir 60 to the system. Reservoir 60 may be used to store some blood volume that may be added to the circulation in case blood collection from patient becomes interrupted. Alternatively, reservoir 60 may be used to store excess in blood volume from the patient or may blood intended for transfusion into the patient, therefore the pump is used to introduce this extra blood. Reservoir 60 may be in series with inflow cannula 80 (not shown) instead of being in parallel (as shown in FIG. 7C). In this arrangement pump 10 will siphon blood from the reservoir (assuming the reservoir is made from soft pliable walls) instead of siphoning directly from the patient. The advantage of this arrangement is the buffering of the pump suction from acting on the patient.

In accordance with the present invention, one method of using the pump-oxygenator system described herein for (by way of example only) treating heart failure, will be described as follows:

1. Percutaneously cannulate a patient's vein with inflow cannula 80. Inflow cannula 80 may be provided in many different diameters and lengths to suite different patients and different applications. The Seldinger technique may be used to insert the cannula into the femoral vein to drain venous blood into the circuit.

2. Inflow cannula 80 may then be connected to the circuit of choice. Due to the small volume of the entire circuit, blood may be used to prime the circuit. Usually, saline is used to prime standard cardiopulmonary circuits because of their large volume. Standard circuits volume may range from 100 cc upward to 1500 cc. The circuit volume described in this invention may be well below 100 cc and possible down to 10 cc. The difference in prime volume is a key factor that allows the use of blood to prime the circuit of the present invention instead of saline as in prior art systems. Using patient's blood to prime the system will eliminate the dilution the patient's blood suffers when saline is used. Diluting patients blood with saline reduce the oxygen carrying capacity of the blood such that a higher circulation level is needed to achieve the same tissue oxygenation level.

3. Pump 10 may then be inserted through manifold side port 101 and secured in place by hemostasis valve 102. Hemostasis valve 102 also serves the purpose of keeping air from entering or blood leaving manifold 100.

4. Oxygenator 20 may be inserted through the second side port 101' and secured in place by hemostasis valve 102' (before or after the placement of the pump 10 within the manifold 100). If placed after the pump 10, oxygen flow may be started at this point and the oxygenator 20 checked for proper function.

5. Ballooned catheter 110 may be inserted through an appropriate side port and advanced to the bifurcation between main trunk 104 and side trunk 105 as shown in FIG. 5.

6. Outflow cannula 90 may be inserted in the patient in a similar manner as that employed to insert inflow cannula 80 (i.e. by using the Seldinger technique). Outflow 90 may preferably be primed with the patient's blood. In case outflow cannula 90 is placed in an artery, a pair of hemostats may be used to control flood flow through the cannula 90.

7. The primed circuit may then be attached to the primed outflow cannula 90 while keeping outflow cannula 90 clamped to control flow to or from outflow cannula 90. All cannulae (inflow cannula 80 and/or outflow cannula 90) may be equipped with a quick-connect 103 or 103' for quick and ease of attaching the cannula to the circuit.

8. Large amounts of air may be removed at this point through any port such as port 31 of bubble trap 30.

9. By running pump 10 while keeping occluding balloon 112 deflated, blood will circulate in a closed loop so as to flush any air entrapped in the oxygenator or any other part of the circuit. Air may be removed from the circuit once again via venting port 31 of bubble trap 30. At this point, the desired outflow through cannula 90 may be accomplished by removing the clamp on the outflow cannula 90, activating the pump 10, adjusting the gas flow to oxygenator 20 to a desired value, adjusting the flow of fluid (hot or cold) to heater exchanger 40, and adjusting the degree to which the occluding balloon 112 is inflated.

As noted above, the selective inflation of occluding balloon 112 controls the portion of blood that returns to the pump inlet and the portion of blood that flows to the patient. Blood has the preference to recirculate to the pump inlet since it is the least resistive path for the blood flow. As such, the more the occluding balloon 112 is inflated, the more flow will diverted to the patient. Stated another way, occluding balloon 112 determines the ratio of blood returning to the pump 10 from the outflow cannula 90 versus the new blood coming from inflow cannula 80. The rotational rate of the pump 10 determines the total volume of blood flowing through pump 10. A high flow rate is typically desired since the higher the flow rate of pump 10 relative to outflow cannula 90, the more oxygenation will take place. Similarly, the higher the recirculating blood portion, the smaller the oxygenator 20 may be since the same blood will pass multiple times over oxygenator 20 and get a higher level of oxygenation. It may be desired at times to use a vacuum source to drive the flow of oxygen in the system rather than positive pressure. Vacuum driving will favor blood entry into the micropores of oxygenation fibers 25 rather than air leaving into the blood.

A significant aspect of the pump-oxygenator system of the present invention is the capability of easily replacing components without stopping the system operation of pump 10, oxygenator 20, heat exchanger 40, and balloon catheter 110. This eliminates one of the main draw-backs of prior art, which required the entire system to be stopped in order to replace even one element. This, in turn, required subsequent re-priming of the system after the replacement procedure had taken place. This "switch out" capability of the present invention is a significant improvement over the prior art in that component replacement is frequently required due to fast degradation of oxygenator elements.

Figure 9:
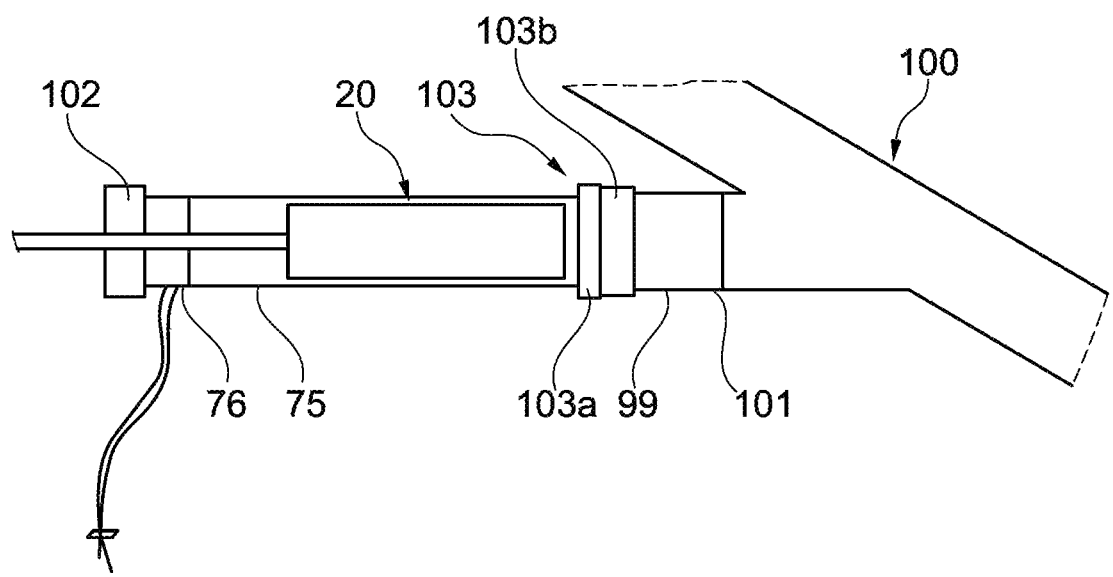
FIG. 9 is a detailed view of the components used for replacing circuit components without the need to interrupt system operation.

FIG. 9 shows one manner of accomplishing the "switch out" feature of the present invention. Oxygenator 20, for example, may be placed inside soft tube 75, which may be made from silicone or similar soft medical tubing. The proximal end of soft tube 75 may be preferably equipped with venting port coupling 76 coupled to hemostasis valve 102. The distal end of soft tube 75 is fitted with quick-connect fitting 103a (male), wherein quick-connect fitting 103b (female) is attached to manifold side 101 of manifold 100. To insert oxygenator 20 into manifold 100, clamping section 99 (which is made of similar material to soft tube 75) is clamped using a standard tubing clamp. Quick-connect fitting 103a may then be coupled to quick-connect fitting 103b (to thereby form a unitary quick-connect coupling 103). The clamp may then be removed from clamping section 99, which serves to force blood into soft tube 75 and oxygenator 20. Air may be removed from soft tube 75 through venting coupling 76 and may be augmented by tapping, massaging, knocking soft tube 75 to release any entrapped air in oxygenator 20. After removing all entrapped air, oxygenator 20 may be advanced through quick-connect 103 and clamping section 99 into manifold 100 without interrupting system operation.

To remove oxygenator 20 from service or to replace it, oxygenator 20 may be pulled back into soft tube 75 by pulling the oxygenator sheath 23 until oxygenator 20 is past quick-connect 103. Clamping section 99 may then be clamped using a standard tube clamp. At this point, quick-connect 103 may be separated into its quick-connect male fitting 103a and quick-connect female fitting 103b such that the existing oxygenator 20, soft tube 75, venting coupling 76, and hemostasis valve 102 may be replaced by a new set. The same removal replacement method may be used for other component such as, pump 10, heat exchanger 40, or ballooned catheter 110.

Figure 10:
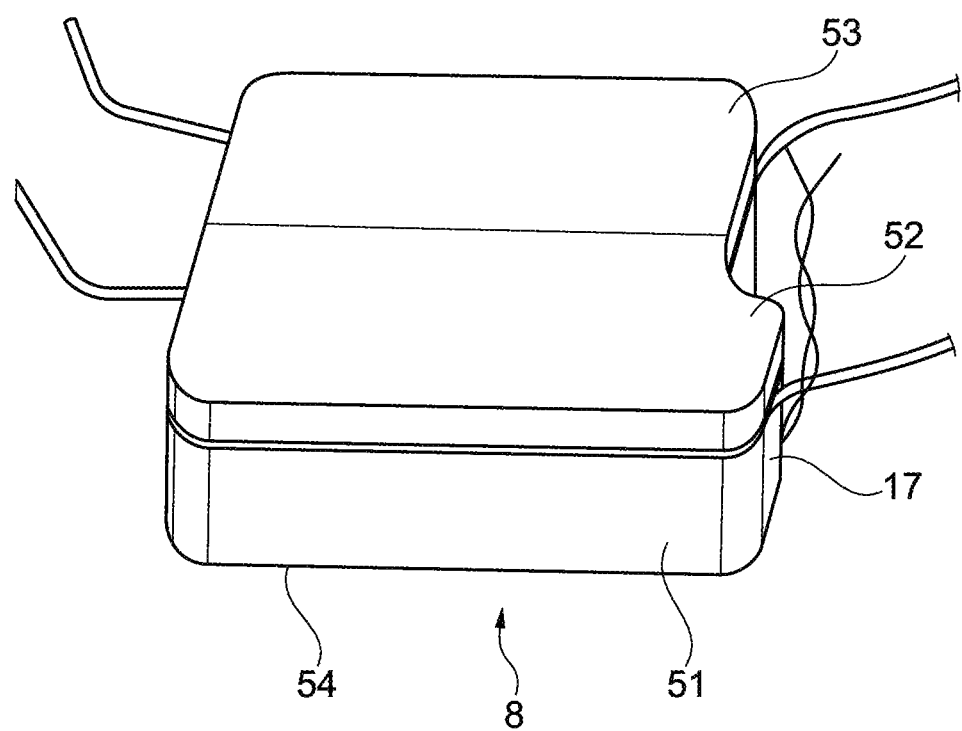
FIG. 10 is a perspective view of another embodiment of a pump-oxygenator system according to the present invention.
Figure 11A:
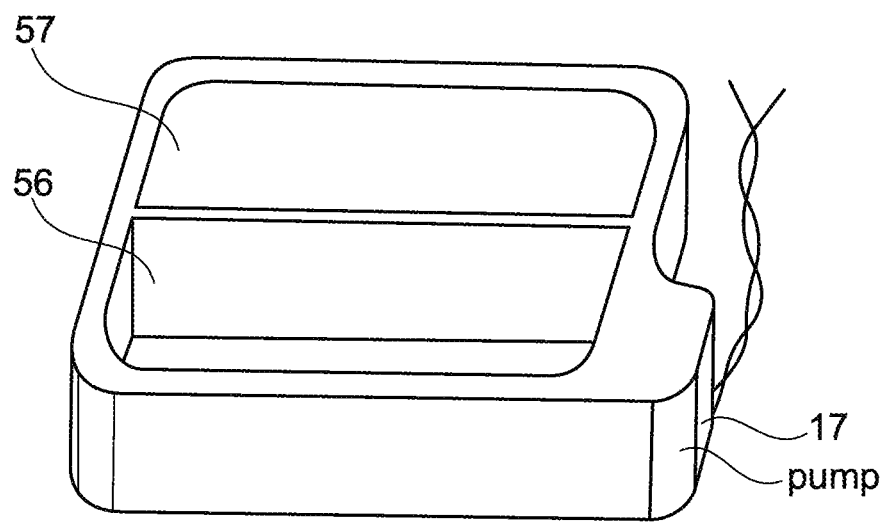
FIG. 11A and FIG. 11B are top and bottom views, respectively, of the pump-oxygenator system illustrated in FIG. 10.
Figure 11B:
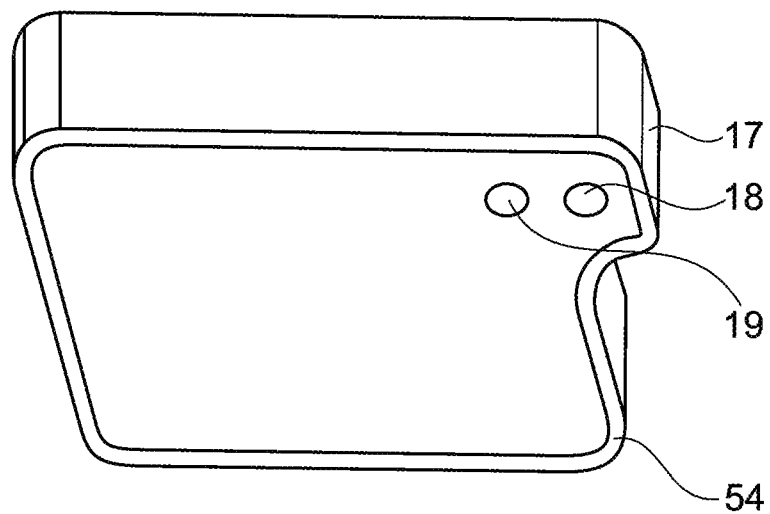

FIG. 10 illustrates another pump-oxygenator system according to the present invention comprising an extracorporeal system 8 including a base 51, a lower oxygenator cartridge 52, an upper oxygenator cartridge 53, an integrated pump compartment 17, and a sterile barrier 54. As shown in FIGS. 11a-11b, base 51 comprises two cavities, namely, an upper oxygenator compartment 57 and a lower oxygenator compartment 56, which are located on one side of base 51 (referred to as the "top side" herein) and shaped to receive upper oxygenator cartridge 53 and lower oxygenator cartridge 52, respectively. Base 51 also includes an integrated pump (not shown), which is fully encapsulated inside the walls of base 51 and preferably a standard miniaturized rotary pump of the centrifugal type with an integrated electric motor encapsulated inside pump compartment 17 of base 51. The inflow port of the integrated pump (not shown) is in direct communication with the system inflow opening 18 located on the opposite side (referred to as the "bottom side" herein) of lower oxygenator compartment 56 and adjacent to the system outflow opening 19. Sterile barrier 54 is preferably an adhesive and/or foam base material that is disposed at the periphery of base 51 on the bottom side to interface with the patient skin and form a seal between the inside and outside area formed by sterile barrier 54. Sterile barrier 54 may preferably be saturated with a concentrated antibacterial and antiviral solution that prevents the crossing of any living organism from the outside to the inside of sterile barrier 54. Sterile barrier 54 may be made of flexible material and shaped to allow the use of suction (not shown) along its entire length to assure the adhesion between sterile barrier 54 and the patient skin.

Figure 12A:
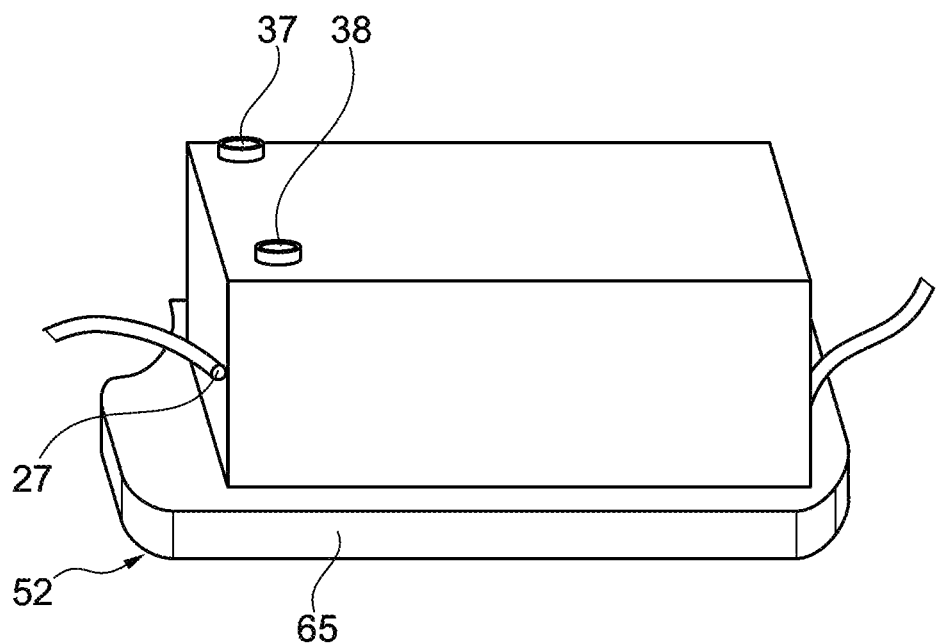
FIG. 12A is a perspective view of an oxygenator cartridge employed as part of the pump-oxygenator system illustrated in FIG. 10.
Figure 12B:
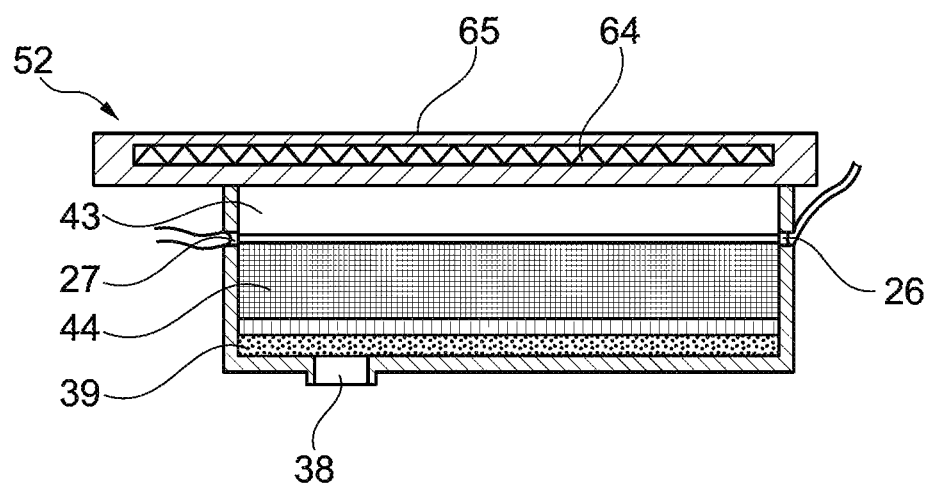
FIG. 12B is a cross section view of parts illustrated in FIG. 12A.

As shown in FIG. 12A and FIG. 12B, each oxygenator cartridge (lower oxygenator cartridge 52 and upper oxygenator cartridge 53) comprises a cartridge inflow 37 and a cartridge outflow 38 in communication with cartridge cavity 43. A matrix 44 of hollow fibers (of the type typically used in artificial oxygenators) is layered on top of a blood filtering material, filter mesh 39 (of a type typically used in filtering blood during bypass surgery). Matrix 44 is arranged to receive oxygen mixture, into the interior lumen of the hollow fibers, through oxygen inflow port 26 and return oxygen and carbon dioxide to oxygen outflow port 27 without introducing any gas bubbles into the blood flowing on the exterior surface of the hollow fibers of matrix 44. Blood will pass through filter mesh 39 before exiting the cartridge to capture any particles before entering the patient's blood stream. Filter mesh 39 may be designed to capture particles seized generally larger than 100 micrometers and preferably larger than 25 micrometers.

Oxygenator cartridges 52, 53 may also include a heat exchange element 64, which is a thermal resistor that may be heated electrically. Heat exchange element 64 is mainly used to heat top plate 65 of lower oxygenator cartridge 52 in the case it is desired to heat any blood going through system 8. Upper oxygenator cartridge 53 may be similarly equipped with a heat exchange element (not shown) for the same purpose mentioned above. Alternatively, a manifold design (not shown) may be incorporated in top plate 65 of lower oxygenator cartridge 52 to allow the circulation of cooled or heated fluid in order to cool or heat blood circulating through system 8 if desired by the user. The cooling or heating fluid may be circulated by a miniature pump similar to standard pumps used in bypass surgery for the same purpose (not shown).

Figure 13:
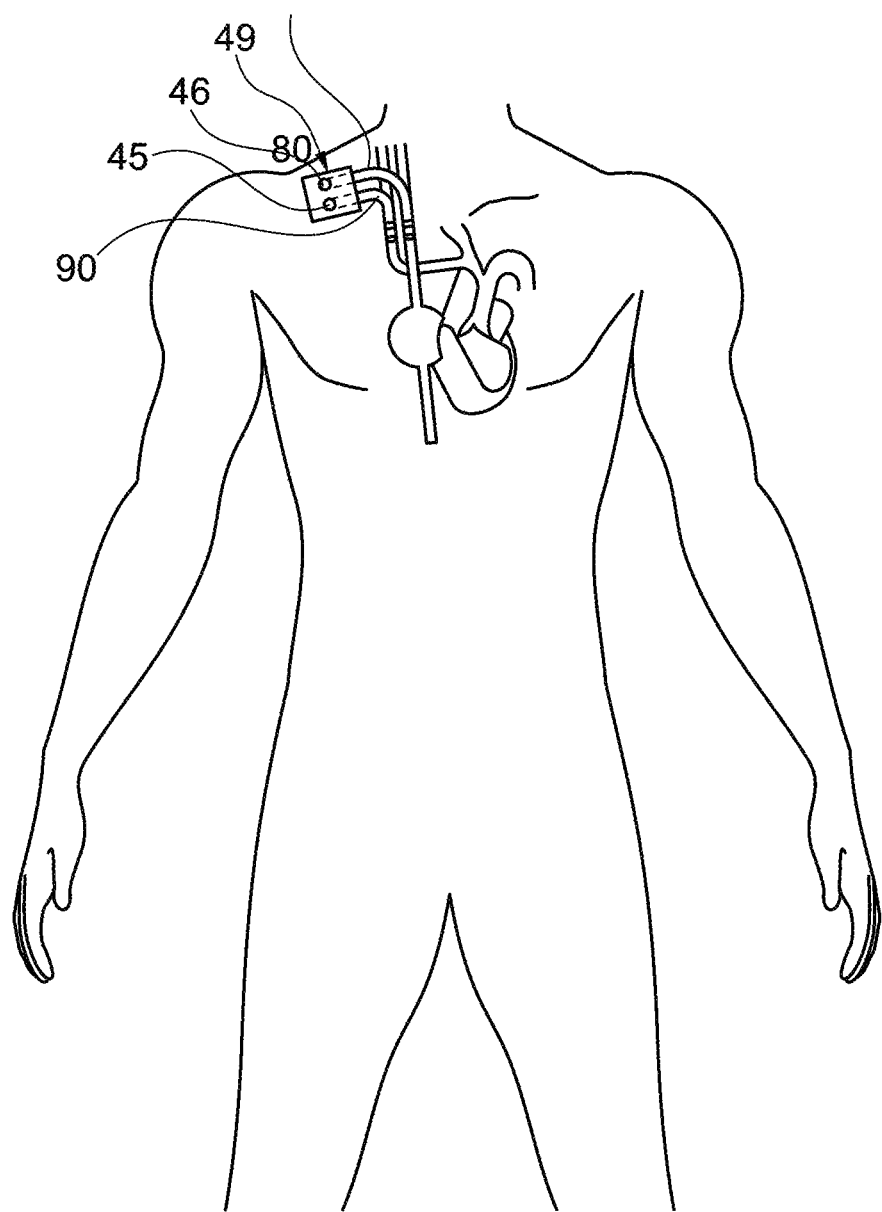
FIG. 13 illustrates pump-oxygenator system of the present invention in use with cannulas connecting the pump and oxygenator to the patient's circulatory system.
Figure 15:
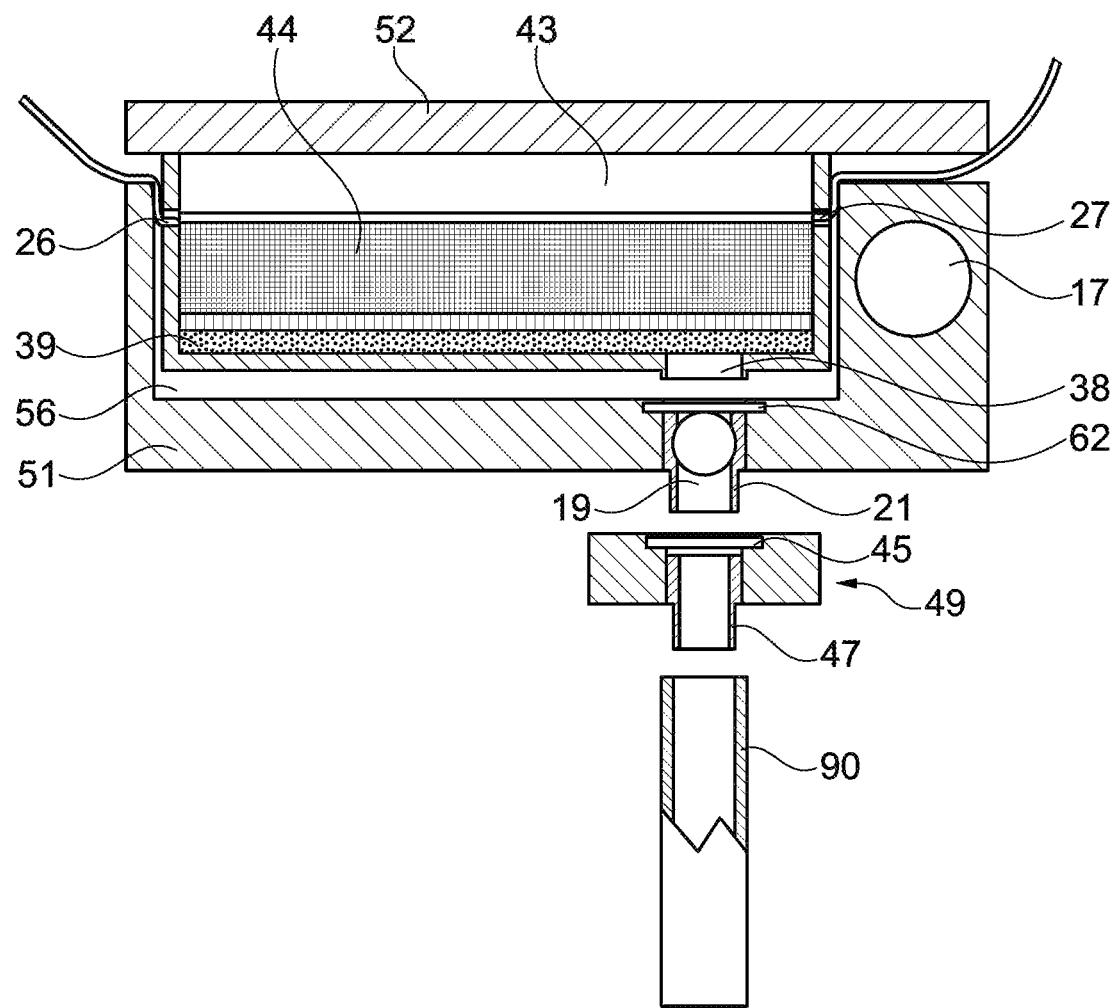
FIG. 15 is an exploded cross section view of the pump-oxygenator system depicted in FIG. 10.

With reference to FIGS. 13-15, inflow cannula 80 and outflow cannula 90 may be are attached to a plate 49. Plate 49 preferably comprises two barbed fittings (inflow barbed fitting 48 and outflow barbed fitting 47) designed to receive the proximal end of inflow cannula 80 and outflow cannula 90 respectively (FIG. 14 shows only one cannula connection, the other connection is identical but not shown). Inflow barbed fitting 48 and outflow barbed fitting 47 may have standard barbs (not shown) used in standard medical connector used in connecting PVC tubing to a tubing connector. In addition, plate 49 may include inflow hemostasis valve 46 and outflow hemostasis valve 45 that seal blood inside the cannula and air outside the cannula prior to attachment of plate 49 to base 51. Both inflow hemostasis valve 46 and out-flow hemostasis valve 45 may have a central perforation or slits (not shown) so as to allow the insertion of a rigid tube (such as system inflow 22 and system outflow 21) into inflow hemostasis valve 46 and outflow hemostasis valve 45, respectively. Upon connection of base 51 to plate 49, system inflow 22 and system outflow 21 engage hemostasis valve 46 and out-flow hemostasis valve 45, respectively, and allow blood to freely flow from and/or into the respective cannula 80, 90.

With particular reference to FIG. 15, lower oxygenator cartridge 52 is designed to fit lower oxygenator compartment 56 and engage system outflow opening 19 by pushing cartridge outflow 38 through lower compartment hemostasis valve 62, which functions similarly to out-flow hemostasis valve 45. In essence, the removal of lower oxygenator cartridge 52 causes the full closure of lower compartment hemostasis valve 56 and containment of blood inside and air outside the manifold of system 8. This design allows the replacement of either oxygenator cartridge (lower oxygenator cartridge 52 and upper oxygenator cartridge 53) without introducing any air into the system or the need to stop the system operation. Only one oxygenator cartridge 52, 53 may be changed at a time in order to keep system 8 operational.

Before the insertion of a new oxygenator cartridge 52, 53, the respective oxygenator compartment 56, 57 may be filled with sterile fluid (such as sterile saline) in order to remove any air in the proximity of the respective hemostasis valve 62, 63. This is done to eliminate the possibility of introducing air into the system during cartridge replacement. In addition, oxygenator cartridges 52, 53 are supplied sterile to the user and may be primed by sterile fluid to remove any air prior to connection to system 8. To further assure the removal of any air from oxygenator cartridges 52, 53 prior to connection, fluid may be circulated through the oxygenator cartridge 52, 53 while it is partially inserted into the appropriate oxygenator compartment 56, 57 that has already been filled with fluid. This step would flush any air from the system 8 to the outside atmosphere prior to connecting the oxygenator cartridge 52, 53. A small circulating pump (not shown) may be used for this step to completely prime the oxygenator cartridge 52, 53 before use.

Figure 16:
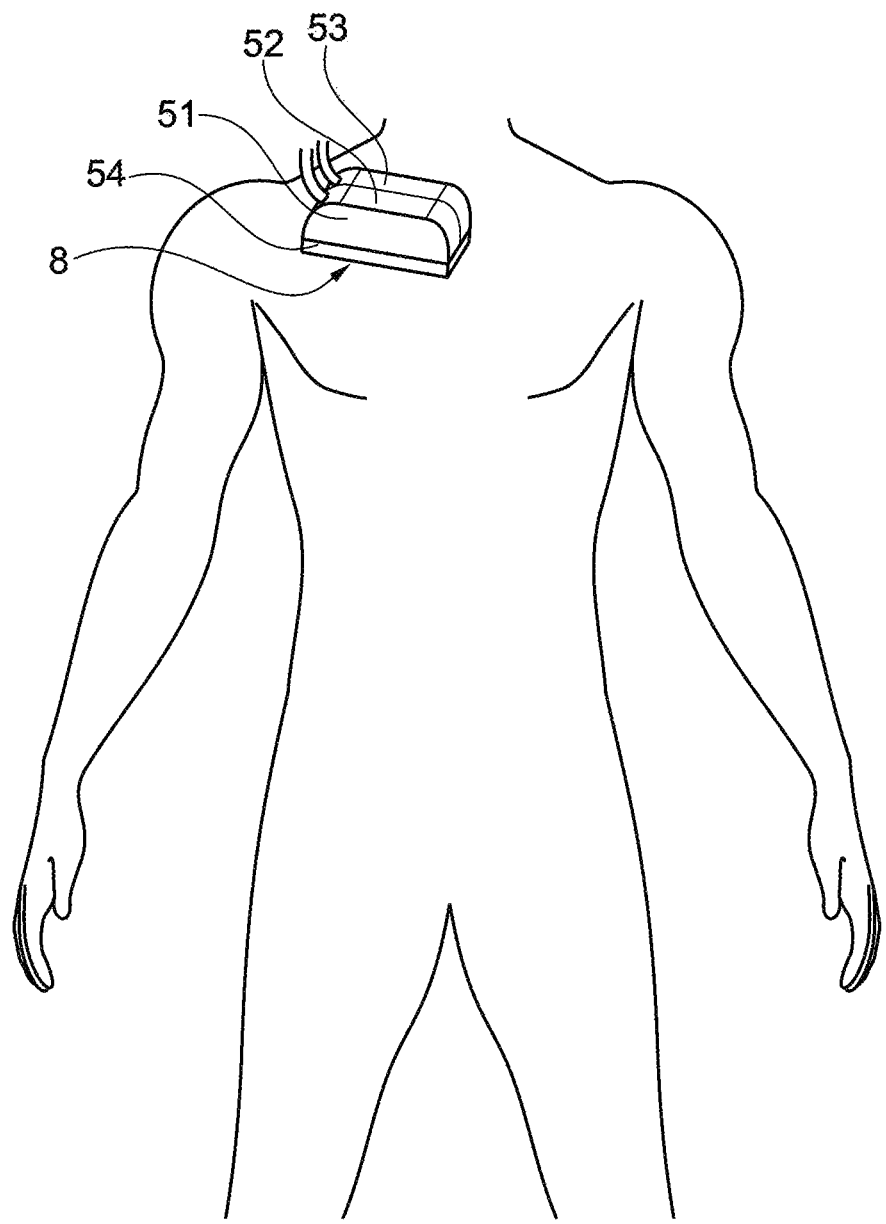
FIG. 16 is a perspective view of the pump/oxygenator system depicted in FIG. 10 positioned on a human body.

FIG. 16 illustrates the system 8 mounted to a patient chest to allow free movement of the patient. A backpack (not shown) may be worn by the patient that may provide control, power, oxygen, and other functions (such as a small pump to circulate heating or cooling fluid) to system 8.

In accordance with any embodiment of the present invention, an electronic controller that controls many of the invention feature (such as pump speed, oxygen gas volume delivery, blood heating) and many diagnostic sensors that indicates the proper performance of the system is required. The specifics of such controller are common those skilled in the art.

Those skilled in the art will recognize, or be able to ascertain, using no more than routine experimentation, many equivalents to the specific embodiments of the invention described herein. In addition, it will be appreciated, of course, that various modifications may be made in the preferred embodiment illustrated above, and these modifications may be made without actually departing from the spirit and scope of the present invention.

The invention claimed is:

1. A blood pump-oxygenator system for increasing perfusion and oxygen level in a patient, comprising at least one blood pump (10), an oxygenator (20), an inflow cannula (80), and an outflow cannula (90), which are connected so as to form a closed series circuit to be operable as a cardiopulmonary bypass system adapted for extracorporeal processing of the patient's blood, wherein the blood pump (10) is configured to convey blood through the circuit from the patient into the inflow cannula (80), through the oxygenator (20) and out of the outflow cannula (90) back into the patient, wherein the system further comprises a manifold (100) connected between the inflow cannula (80) and the outflow cannula (90) so that the blood passes through the manifold (100), wherein the manifold (100) accommodates the blood pump (10) and the oxygenator (20) and is designed so as to form a recirculation loop configured to recirculate at least part of the blood in the circuit such that the blood passes over the oxygenator (20) multiple times, and wherein the system further comprises an extra blood pump (50) positioned at the out-flow cannula (90) and configured to deliver a set volume to the patient, wherein the extra pump (50) is configured to be controlled independently from the blood pump (10) that circulates the blood in the manifold (100) including the oxygenator (20).

2. The blood pump-oxygenator system of claim 1, wherein the blood pump (10) is configured to be set to deliver a flow rate in excess of what is desired to deliver to the patient, wherein all excess flow is re-circulated through the oxygenator (20) such that the blood is repeatedly subject to the exchange of O2 and CO2 within the oxygenator (20).

3. The blood pump-oxygenator system of claim 1, wherein the manifold (100) comprises a main trunk (104) and a side trunk (105), the main trunk (104) having a proximal end (108) connected to the inflow cannula (80) and a distal end (109) connected to the out-flow cannula (90), wherein the side trunk (105) has a proximal end (107) and a distal end (106) connected to the main trunk (104) so as to form the recirculation loop.

4. The blood pump-oxygenator system of claim 1, wherein the manifold (100) comprises at least one manifold side port (101) configured to allow replacement of at least one of the blood pump (10) and the oxygenator (20).

5. The blood pump-oxygenator system of claim 3, wherein the blood pump (10) is placed through a first manifold side port (101) at the main trunk (104) and advanced into the main trunk (104) downstream from a proximal junction of the side trunk (105) with the main trunk (104), and wherein the oxygenator (20) is placed through a second manifold side port (101') at the side trunk (105) and advanced through a portion of the manifold side trunk (105), wherein respective hemostasis valves (102, 102') form a tight seal around a pump sheath (13) and an oxygenator sheath (23), respectively, extending through the respective manifold side port (101, 101').

6. The blood pump-oxygenator system of claim 3, wherein the blood pump (10) is placed through a first manifold side port at the main trunk (104) and advanced into the main trunk (104) upstream from a distal junction of the side trunk (105) with the main trunk (104), and wherein the oxygenator (20) is inserted through a second manifold side port (101) into the main trunk (104) upstream of the blood pump (10).

7. The blood pump-oxygenator system of claim 5, wherein a balloon catheter (110) is placed trough a third manifold side port (101') having a hemostasis valve (102") that seals around a balloon catheter shaft (111) with an occluding balloon (112) attached to the balloon catheter shaft (111) and placed in the side trunk (104) downstream of the oxygenator (20), wherein the balloon catheter is configured to control the amount of blood flowing through the manifold main trunk (104) and the manifold side trunk (105) by inflating and deflating the occluding balloon (112).

8. The blood pump-oxygenator system of claim 7, wherein the occluding balloon (112) is configured to be synchronized with the heart rhythm, wherein preferably the occluding balloon (112) is fully deflated during systole and fully inflated during diastole.

9. The blood pump-oxygenator system of claim 1, wherein the manifold (100) is equipped with at least one quick-connect coupling (103) configured to allow connection and disconnection of the inflow cannula (80) and the outflow cannula (90), respectively, to and from the manifold (100).

10. The blood pump-oxygenator system of claim 1, further comprising a pressure feedback system to control pump suction force of the blood pump (10).

11. The blood pump-oxygenator system of claim 1, wherein the system is configured to circulate gas in the oxygenator with negative pressure.

12. The blood pump-oxygenator system of claim 1, further comprising a gas heater and thermal insulation.

13. The blood pump-oxygenator system of claim 1, wherein the blood pump (10) is as a rotary pump or a displacement pump, preferably a rotary pump of the centrifugal type or the axial type, wherein the blood pump (10) is configured to be directly driven by an electric motor or to be driven by a flexible drive cable (14) that links the blood pump (10) to the electric motor either magnetically or directly.

14. The blood pump-oxygenator system of claim 1, wherein the blood pump (10) is of the axial flow type with a rotor (11) situated inside a pump housing (12), with a drive cable (14) inside a sheath (13) coupled to the rotor (11) in such a manner that rotation of the drive cable (14) by an electric motor causes rotation of the rotor (11) and pumping of blood from the distal end to the proximal end of housing (12) so as to transport the blood from the inflow cannula (80) toward the outflow cannula (90).

15. The blood pump-oxygenator system of claim 1, wherein the blood pump (10) is configured to be placed inside manifold (100) by passing it through a first manifold side port (101), wherein a hemostasis valve (102) closes around a sheath (13) connecting to the blood pump (10), the hemostasis valve (102) providing hemostasis after the blood pump (10) is placed therethrough.

16. The blood pump-oxygenator system of claim 1, wherein the oxygenator (20) is configured to be placed inside the manifold (100) through a second manifold side port (101') with a hemostasis valve (102') forming a seal around an oxygenator sheath (23).

17. The blood pump-oxygenator system of claim 16, wherein the oxygenator sheath (23) has at least two lumens, including an inflow lumen (28) for oxygen delivery to the oxygenator (20) and an outflow lumen (29) for removal of carbon dioxide from the oxygenator (20), wherein the oxygenator (20) comprises a plurality of hollow oxygenation fibers (25) that allow for blood to pass between the oxygenator fibers (25) to intake oxygen and release carbon dioxide, while oxygen is passed through an inside lumen of the oxygenator fibers (25) from the inflow lumen (28) at one end of the oxygenator fibers (25) and returned from the other end of oxygenator fibers (25) to the outflow lumen (29).

18. The blood pump-oxygenator system of claim 1, wherein the oxygenator (20) is matched in size to an inside diameter of the manifold (100) to allow a close fit in order to limit blood flow around oxygenator (20) and force the blood to flow through oxygenator fibers (25).

19. The blood pump-oxygenator system of claim 1, wherein the manifold (100) includes a bubble trap (30), preferably in the main trunk (104), with the blood pump (10) located at an inlet port (32) of the bubble trap (30), wherein the blood pump (10) is configured to empty all blood into the bubble trap (30) before it leaves the bubble trap (30) at an outlet port (33), the bubble trap (30) including a venting port (31) at the top of a conical top to vent any air entrapped in bubble trap (30), wherein the inlet port (32) is preferably located close to a top end of bubble trap (30) while the outlet port (33) is preferably located close to a bottom end.

20. The blood pump-oxygenator system of claim 1, further comprising a heat exchanger (40) configured to regulate the temperature of the circulating blood, wherein the heat exchanger (40) is preferably a catheter system comprising a dual lumen catheter (41) configured to conduct a heated or cooled fluid through hollow heating fibers (42) that are made of heat conducting material, with one end of heating fibers (42) in communication with one lumen of dual lumen catheter (41) while the other end of heating fibers (42) is in communication with the other lumen of dual lumen catheter (41).

\* \* \* \* \*